United States Patent Office.

FREDERICK WILCOX, OF WATERBURY, ASSIGNOR TO H. B. WILCOX. OF PORTLAND, CONNECTICUT.

Letters Patent No. 96,524, dated November 2, 1869; antedated October 29, 1869.

IMPROVED PROCESS OF REFINING THE WASTE FROM GERMAN SILVER AND OTHER METALS.

The Schedule referred to in these Letters Patent and making part of the same.

*To all whom it may concern:*

Be it known that I, FREDERICK WILCOX, of Waterbury, in the county of New Haven, and State of Connecticut, have invented a new Process for Refining the Waste of German Silver and other Metals; and I do hereby declare the following to be a full, clear, and exact description of the same.

This invention relates to the utilization of the waste from German silver and similar metals, which have, to a great extent, become carbonized, as by melting, and which has heretofore been an entire loss; and, to enable others skilled in the art to work my new process, I will proceed to a full description of the same.

I fuse the carbonized impure wastes, and while in a molten state, pour them into another crucible, or suitable receptacle, into which has been placed perfectly dry nitrate of soda, or other material which will give all the requisite amount of oxygen.

The action of the molten metal is to decompose the nitrate of soda, oxygen, and hydrogen in the form of gas. The oxygen combines with the excess of carbon, and is carried away in carbonic oxide and carbonic acid, leaving the metal in a restored state, with a little slag on the surface, which may be removed by a slight blow, and the restored metal remelted, and cast into any desired form, or used in any manner for which such metal is now used.

The slag may be fused with an excess of carbon flux, when it will give up any trace of metal it may possibly contain, through mechanical ebullition.

I find, in practice, the proportion of nitrate of soda to produce the best result, to be eleven pounds of dry nitrate of soda to one hundred pounds of waste metal to be decarbonized.

By this process, these wastes, which have not before been utilized, although much time and money have been spent in attempting so to do, are made of very great value, and, as it will be seen, at a very slight cost.

Having fully described my invention,

What I claim as new and useful, and desire to secure by Letters Patent, is—

The process, herein described, for decarbonizing the wastes of German silver and similar metals.

FRED. WILCOX.

Witnesses:
   JOHN O'NEIL, Jr.,
   ALFRED NORTH.